UNITED STATES PATENT OFFICE.

HERBERT C. REED, OF STAMFORD, CONNECTICUT.

METHOD OF MANUFACTURING OXALIC ACID.

1,217,218.  Specification of Letters Patent.  Patented Feb. 27, 1917.

No Drawing.  Application filed September 23, 1915. Serial No. 52,225.

*To all whom it may concern:*

Be it known that I, HERBERT C. REED, a citizen of the United States, and resident of Stamford, county of Fairfield, and State of Connecticut, have invented certain new and useful Improvements in Methods of Manufacturing Oxalic Acid, of which the following is a specification.

My invention relates to the manufacture of oxalic acid ($H_2C_2O_4$) and salts of oxalic acid, and consists in the method hereinafter described and claimed.

By my improved method I utilize the waste liquor derived in the various processes employed in the production of cellulose, such as the manufacture of chemical paper pulp, said liquor being variously termed for example, "sulfite or sulfate liquor" or "black liquor," etc., and which I hereinafter designate as "waste liquor" and contains certain organic materials having at the present time no well defined chemical formula, but being usually considered a complex mixture of carbohydrates, ligno-celluloses, organic sulfo compounds, all of which have organic complexes capable of yielding oxalic acid by my improved method.

Generally my improved method consists in treating the organic matter in such waste liquor with a suitable oxidizing agent, such as preferably nitric acid, or some oxid of nitrogen. To carry out said process I evaporate said waste liquor to a solid, dry, or semi-dry residue, then to say 100 pounds of such residue I add preferably about 300 pounds of commercial concentrated nitric acid slowly, and with constant stirring, maintaining the temperature at approximately 95° C. When the frothing, which the reaction between the residue and the nitric acid produces, has ceased, the mixture is then subjected to heat, and the excess of nitric acid, which has not entered into the reaction, is driven off and recovered, the heating being continued to remove the excess water and small amounts of nitric acid and oxids of nitrogen to the point at which crystallization of the oxalic acid occurs. The mixture is then run into suitable containers to permit of crystallization, and the crystals may be purified by dissolving in water, and re-crystallizing in the usual manner. I prefer to utilize the vapors of nitric acid as they are driven off in the heating operation, by passing them through a body of the waste liquor before it has been evaporated to a solid, thereby assisting in the subsequent treatment of the liquor.

I do not confine myself to the specified amounts of "waste liquor", or nitric acid, since the oxids of nitrogen may be employed by passing them in gaseous form through the waste liquor prior to the evaporation of the same, and other acids, such for example as chromic acid, may be employed. Neither do I confine myself to the ultimate production of oxalic acid, but also claim the production of any salt of oxalic acid, or mixture of such salts.

Having thus described my invention, what I claim and desire to secure by Letters Patent is:

1. The method of treating the waste liquor of chemical paper pulp manufacture which consists in reducing such liquor to an approximately dry residue, then subjecting the same to the action of strong nitric acid in an amount considerably more than 100% by weight of such residue and maintaining an elevated temperature, but below the boiling point of the mixture at the pressure employed, in order to oxidize the mixture, and then heating the mixture sufficiently high to evaporate the surplus nitric acid and water, and then recovering oxalic acid from the residual liquor.

2. The method of treating the waste liquor of chemical paper pulp manufacture which consists in reducing such liquor to appoximately dry residue, then subjecting the same to the action of strong nitric acid in an amount equal to several times the weight of such residue and maintaining an elevated temperature, but below the boiling point of the mixture at the pressure employed, in order to oxidize the mixture, and then heating the mixture sufficiently high to evaporate the surplus nitric acid and water, and then recovering oxalic acid from the residual liquor.

3. The method, which consists in evaporating the waste liquor produced in the chemical manufacture of paper pulp to approximately dry residue, then adding thereto concentrated nitric acid in the substantial proportions of 300 pounds of acid to 100 pounds of residue maintaining the temperature at about 95° C. until the oxidizing action is completed, and then heating the mixture to expel the excess of acid and water until the point of crystallization of the oxalic acid thereby produced is reached.

Signed at New York, in the county of New York and State of New York, this 21st day of Sept., 1915.

HERBERT C. REED.